United States Patent [19]
Scheetz et al.

[11] Patent Number: 5,822,302
[45] Date of Patent: Oct. 13, 1998

[54] LAN EARLY WARNING SYSTEM

[75] Inventors: Jeffrey P. Scheetz; John D. Cole; Hayes J. Landry, Jr.; Kevin M. Royce, all of Colorado Springs, Colo.

[73] Assignee: MCI Communications Corporation

[21] Appl. No.: 758,112

[22] Filed: Nov. 25, 1996

[51] Int. Cl.⁶ .............................. G06F 11/00; H04J 3/14
[52] U.S. Cl. .................. 370/245; 370/248; 395/183.01; 395/183.13
[58] Field of Search ................................ 370/242, 245, 370/248, 400; 395/182.02, 183.01, 183.02, 183.13, 200.53, 200.54; 364/551.01; 371/67.1, 68.2

[56] References Cited

U.S. PATENT DOCUMENTS 5,572,533  11/1996  Sunada et al. ..................... 370/245
5,627,766  5/1997   Beaven ............................. 364/551.01

*Primary Examiner*—Min Jung

[57] ABSTRACT

The present invention automatically monitors a Data Center Operations (DCO) network (or any LAN/WAN network) for circuit outages and sends a notification if an outage is detected. A console at a Remote Operations Center periodically pings a console at each Data Center (pinging may also be on-demand). The remote console receives responses from each pinged Data Center console. A response will be received for each possible route between the Data Center and the Remote Operations Center. These responses will indicate the route that was taken. The routes indicated in the responses are then compared with a table of routes previously identified as routes of concern or interest. Also listed in this table is a circuit identifier for each route. Any route listed in this table for which a response was not received is identified as unavailable. An automatic notification, such as a page, is then sent identifying this route by the circuit identifier.

10 Claims, 6 Drawing Sheets

TABLE 1: PCs TO PING

| | |
|---|---|
| SAC1 | 40000624DC51 |
| NOR1 | 400004299292 |
| PYM1 | 400002395270 |
| FPB1 | 400008650435 |
| OMZ1 | 40000564DC11 |
| CAD1 | 40000622CA01 |

*FIG. 4*

TABLE 2: ROUTES DESIRED

| REC | ROUTE | CIRCUIT ID |
|---|---|---|
| 1 | A11-C11-A22-B11 | THE MGH49114-0003 CIRCUIT FROM ROC1 TO DC1 IS DOWN |
| 2 | A11-C22-A22-B11 | THE MGH49114-0008 CIRCUIT FROM ROC1 TO DC1 IS DOWN |
| 3 | A11-B11 | THE MGH49114-0006 CIRCUIT FROM ROC1 TO DC1 IS DOWN |
| 4 | A11-C11-A22-B22 | THE MGH44625-0001 CIRCUIT FROM ROC1 TO DC2 IS DOWN |
| 5 | A11-C22-A22-B22 | THE MGH44625-0004 CIRCUIT FROM ROC1 TO DC2 IS DOWN |
| 6 | A11-B22 | THE MGH44625-0008 CIRCUIT FROM ROC1 TO DC2 IS DOWN |
| 7 | A11-C11-A22-B33 | THE MGH93813-0001 CIRCUIT FROM ROC1 TO DC3 IS DOWN |
| 8 | A11-C22-A22-B33 | THE MGH93813-0002 CIRCUIT FROM ROC1 TO DC3 IS DOWN |
| 9 | A11-B33 | THE MGH93813-0011 CIRCUIT FROM ROC1 TO DC3 IS DOWN |
| 10 | A11-C11-A22-B44 | THE MGH55432-0001 CIRCUIT FROM ROC1 TO DC4 IS DOWN |
| 11 | A11-C22-A22-B44 | THE MGH55432-0006 CIRCUIT FROM ROC1 TO DC4 IS DOWN |
| 12 | A11-B44 | THE MGH55432-0009 CIRCUIT FROM ROC1 TO DC4 IS DOWN |

*FIG. 5*

LANPING.EXE OUTPUT

LANPING: WAITING ON RESPONSE FROM REMOTE
LANPING: FIRST RESPONSE RECEIVED
LANPING: ROUTE WAS:
    (A11) 2 -> (DC2) 1 -> (F25)
LANPING: LATER RESPONSE(S):
LANPING: ROUTE WAS:
    (A11) 2 -> (DC1) 2 -> (071) 1 -> (F25)
LANPING: ROUTE WAS:
    (A11) 1 -> (DC3) 1 -> (071) 1 -> (F25)
LANPING: ROUTE WAS:
    (A11) 1 -> (DC3) 1 -> (071) 2 -> (DC1) 2 -> (DC2) 1 -> (F25)
LANPING: ROUTE WAS:
    (A11) 2 -> (DC6) 1 -> (F55) 1 -> (071) 1 -> (F25)
LANPING: ROUTE WAS:
    (A11) 1 -> (F05) 1 -> (DC5) 2 -> (071) 1 -> (F25)
LANPING: ROUTE WAS:
    (A11) 1 -> (F15) 1 -> (DC4) 2 -> (071) 1 -> (F25)
LANPING: ROUTE WAS:
    (A11) 2 -> (DC6) 1 -> (F55) 1 -> (071) 2 -> (DC1) 2 -> (DC2) 1 -> (F25)
LANPING: ROUTE WAS:
    (A11) 2 -> (DC1) 2 -> (071) 1 -> (F55) 1 -> (DC6) 2 -> (DC2) 1 -> (F25)
LANPING: ROUTE WAS:
    (A11) 1 -> (F05) 1 -> (DC5) 2 -> (DC1) 2 -> (DC2) 1 -> (F25)
LANPING: ROUTE WAS:
    (A11) 1 -> (F15) 1 -> (DC4) 2 -> (DC1) 2 -> (DC2) 1 -> (F25)
LANPING: ROUTE WAS:
    (A11) 1 -> (DC3) 1 -> (071) 1 -> (F55) 1 -> (DC6) 2 -> (DC2) 1 -> (F25)
LANPING: ROUTE WAS:
    (A11) 1 -> (F05) 1 -> (DC5) 2 -> (DC1) 2 -> (DC6) 1 -> (F55) 1 -> (071) 1 -> (F25)
LANPING: ROUTE WAS:
    (A11) 1 -> (F15) 1 -> (DC4) 2 -> (DC1) 2 -> (DC6) 1 -> (F55) 1 -> (071) 1 -> (F25)
LANPING: 14 RESPONSES RECEIVED DURING 5 SECOND WAIT

FIG. 6

LAN EARLY WARNING SYSTEM

RELATED APPLICATIONS

This application relates to co-pending application Ser. Nos. 08/723,746 (COS-94-035) and 08/663,401.

FIELD OF THE INVENTION

The present invention relates to date networks, and more particularly to a monitoring system for a local area network (LAN) that detects network outages.

BACKGROUND OF THE INVENTION

In the following description, Data Center Operations (DCO) refers to the functions of monitoring and managing the operations of computers utilized in data processing. DCO is frequently performed with multiple Data Centers and Remote Operations Centers connected via LANs and WANs. In performing DCO, it is important for the communications links that connect the Data Centers with the Remote Operations Centers to be available and operable. If a circuit outage occurs, it is critical that the DCO support staff be notified quickly to resolve the problem.

It is conventional for such a DCO network to utilize a network management system and organization for monitoring the network and detecting outages. Numerous network management systems exist that provide continuous surveillance of network routers and bridges. If an outage is detected, these systems will issue an alarm.

However, this requires personnel to monitor the system and take appropriate action. Often, the DCO network may be given low priority by the network management organization, and notification of a DCO network outage may be delayed. Also, since redundancy is usually built into a DCO network for reliability purposes, a circuit outage may go unnoticed by DCO staff; if one link goes down, a second redundant link takes over. The circuit outage may go unnoticed until the second link goes down, at which time it can cause operational outages.

Any of these factors result in a DCO network outage going undetected or unresolved for an excessive amount of time.

BRIEF DESCRIPTION OF THE PRESENT INVENTION

The present invention automatically monitors a DCO network (or any LAN/WAN network) for circuit outages and sends a notification if an outage is detected. The system operates independently of network management systems and organizations, and can be managed by the DCO staff. Thus, it provides quicker notification of circuit outages. Since it is fully automated, it allows the DCO staff to easily monitor their network at a first level, without the need for any additional personnel.

A console at a Remote Operations Center periodically pings a console at each Data Center (pinging may also be on-demand). As explained hereinafter, to ping, one employs conventional software that is useful in testing and debugging networks. It sends an ICMP Echo packet and waits for a response. Consoles are standard PC workstations. The remote console receives responses from each pinged Data Center console. A response will be received for each possible route between the Data Center and the Remote Operations Center. These responses will indicate the route that was taken.

The routes indicated in the responses are then compared with a table of routes previously identified as routes of concern or interest. Also listed in this table is a circuit identifier for each route. Any route listed in this table for which a response was not received is identified as unavailable. An automatic notification, such as a page, is then sent identifying this route by the circuit identifier.

BRIEF DESCRIPTION OF THE FIGURES

The above-mentioned objects and advantages of the present invention will be more clearly understood when considered in conjunction with the accompanying drawings, in which:

FIG. 4 is an example of a table of local console addresses to ping during execution of the invention.

FIG. 5 is an example of routes desired for monitoring.

FIG. 6 is a sample display of a ping process output that lists responses received, indicating routes taken.

DETAILED DESCRIPTION OF THE INVENTION

The present invention may be used in virtually any LAN/WAN environment. For the remainder of this disclosure, the DCO network example is described only for exemplary purposes and not by way of limitation. Remote console refers to a PC at a Remote Operations Center and Data Center console refers to a PC at a Data Center. A Data Center console may also be referred to as a local console.

Figure 1:
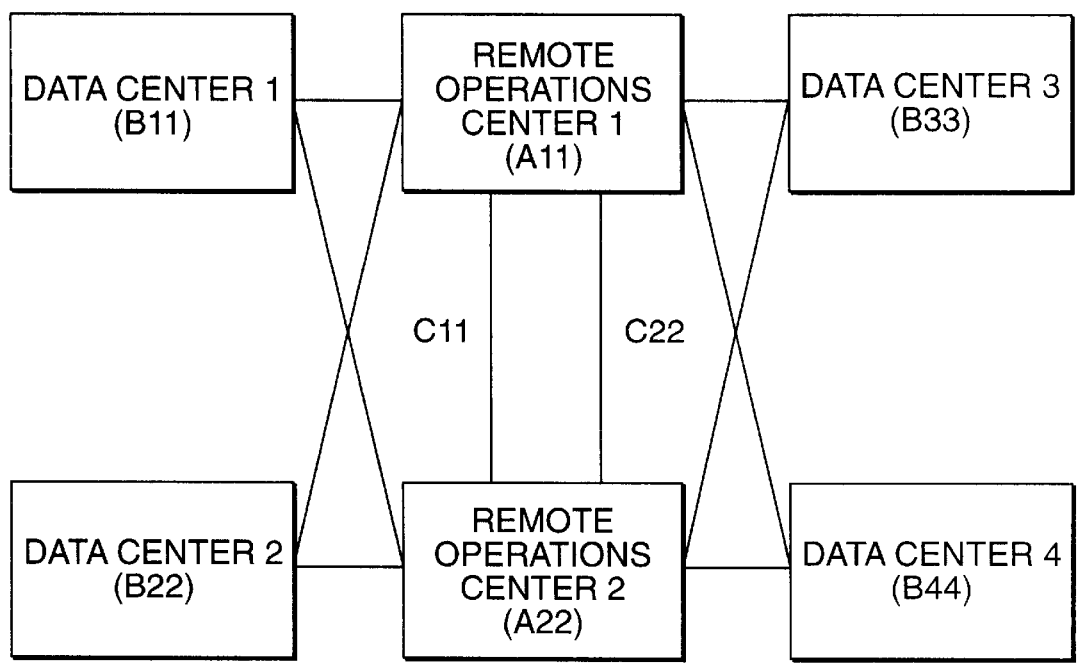
FIG. 1 is a block diagram illustrating the basic network architecture of an exemplary DCO network.

FIG. 1 is a block diagram illustrating the network architecture of an exemplary DCO network. Such an architecture is also described in related patent application Ser. No. 08/723,746 (COS-94-035). Although four Data Centers are shown, in reality any number of Data Centers may be employed. The Data Centers house the computers that perform data processing. There are Remote Operations Centers (two in this example) that are used for data center operations functions, such as monitoring and managing the performance of the Data Center computers. This may be accomplished with remote consoles connected to local consoles at each Data Center. The related patent application Ser. No. 08/723,746 (COS-94-035) describes this concept.

Each Data Center and Remote Operations Center has one or more Token Ring LANs to support internal connectivity among the computers and Data Center local consoles. Each Data Center LAN is then connected to each of the two Remote Operations Center LANs via bridges and routers, as is conventional in the industry. This realizes an enterprise WAN that constitutes the DCO network. Also part of the WAN is redundant connections between the two Remote Operations Centers. Connections among the Data Centers and Remote Operations Centers are standard T1 communication links.

Figure 2:
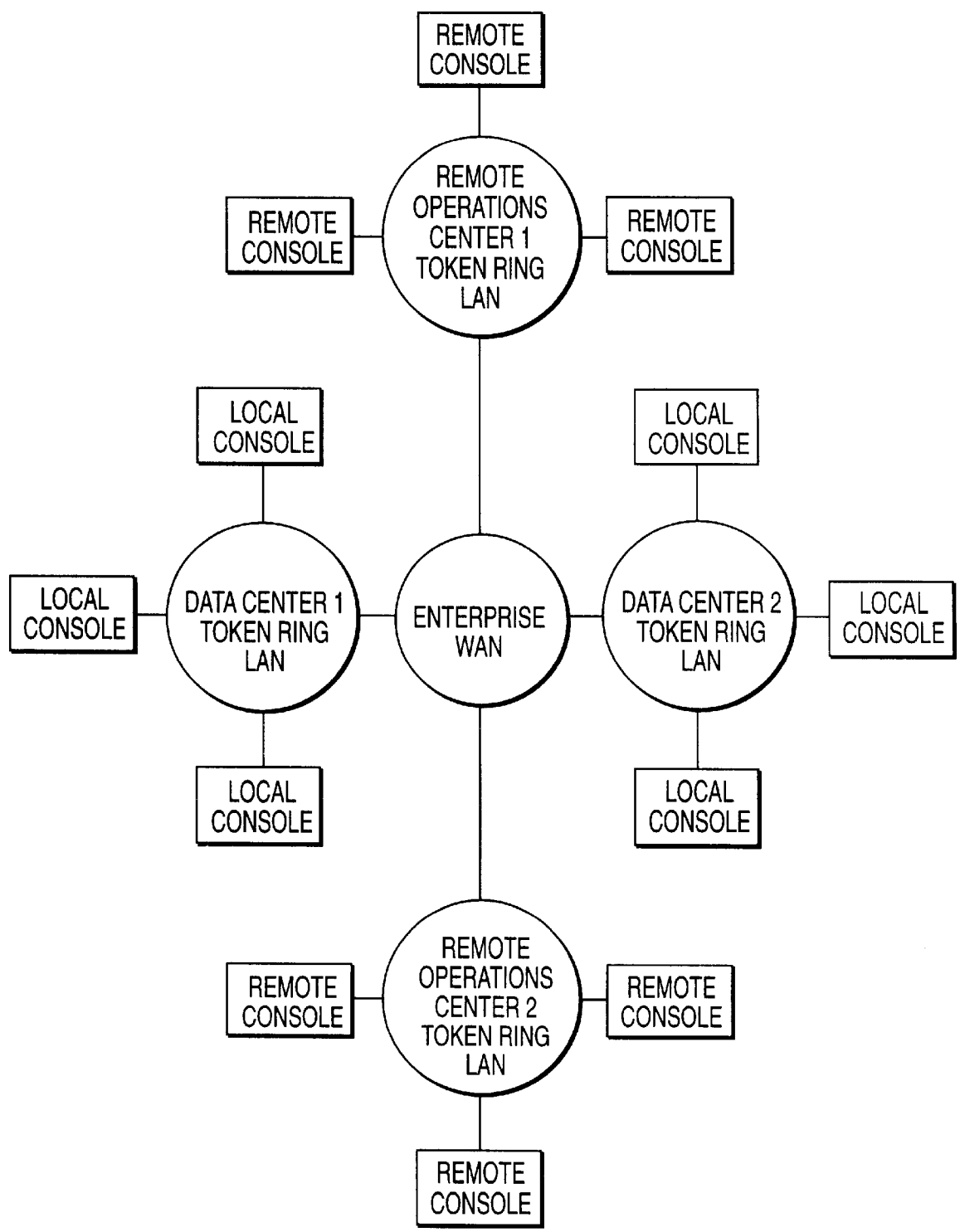
FIG. 2 is a more detailed network architecture diagram of various Data Center And Remote Operations Center LANs connected to an enterprise WAN.

FIG. 2 shows a more detailed network architecture of various Data Center and Remote Operations Center LANs connected to an enterprise WAN. At each Data Center there are several local (Data Center) consoles. These local consoles monitor the computers that perform data processing. There may be one or more Token Ring LANs at each Data Center. At each Remote Operations Center there are several remote consoles. These establish connectivity with one or more local consoles to provide remote operations of the Data Center computers. One or more Data Center and one or more Remote Operations Center, connected by a WAN, constitutes the DCO network.

FIG. 2 shows a logical architecture to illustrate the use of LAN/WAN technology in implementing a DCO network. The redundancy in communications links shown in FIG. 1 is realized with dedicated T1 links connected to bridges and routers at each Center. The interconnection of LANs via bridges and routers is what constitutes the WAN shown in FIG. 2.

The DCO network provides an example of a LAN/WAN environment in which the present invention may be used. Other LAN/WAN architectures will be applicable.

Referring back to FIG. 1, each Data Center and Remote Operations Center represents a node in the DCO network. The nodes have standardized identifiers, such as those shown in FIG. 1: A11 for Remote Operations Center 1, A22 for Remote Operations Center 2, B11 for Data Center 1, etc. In addition, the redundant communications links between Remote Operations Center 1 and Remote Operations Center 2 are identified to distinguish them: C11 and C22. These node and circuit identifiers are used to identify the routes that can be used for communications between Data Centers and Remote Operations Centers. For example, there are three routes of interest between Remote Operations Center 1 and Data Center 1. They are identified as follows:

A11 - C11 - A22 - B11

A11 - C22 - A22 - B11

A11 - B11

There may be other possible routes, such as those involving circular paths, but these are generally not of interest.

A remote console at Remote Operations Center 1 can test these routes and determine if they are all available and detect if any of them are not. The remote console will ping a local console at Data Center 1. It will receive responses from the Data Center 1 console for every route available, including those three listed above. A time limit is set on response to be received to filter out those that take extended offbeat routes that are of no interest.

Each response received by the remote console will indicate the route that was taken. These routes are compared with a list of desirable routes, which are those routes of interest to DCO, such as the three listed above. Any route on this list for which a response was not received triggers an automatic notification indicating that route may be down.

The preferred embodiment of the present invention is configured so that the remote console will ping one local console at each Data Center on a periodic basis (i.e., once every hour). No notification will be sent if no outages are detected. On a less frequent basis (i.e., once every 24 hours), a notification will be sent regardless, to indicate the present invention is performing properly. If no outages are detected, this notification simply indicates such. In other embodiments, the remote console may ping a local console at one or more Data Centers on demand. The remote console may ping consoles at select Data Centers or at all Data Centers.

A timer is set (i.e., 10 seconds) for receiving responses to a ping. This filters out responses that take uninteresting routes. Generally, 10 seconds will be more than sufficient time to receive responses taken on all interesting routes.

Process Flowchart

Figure 3:
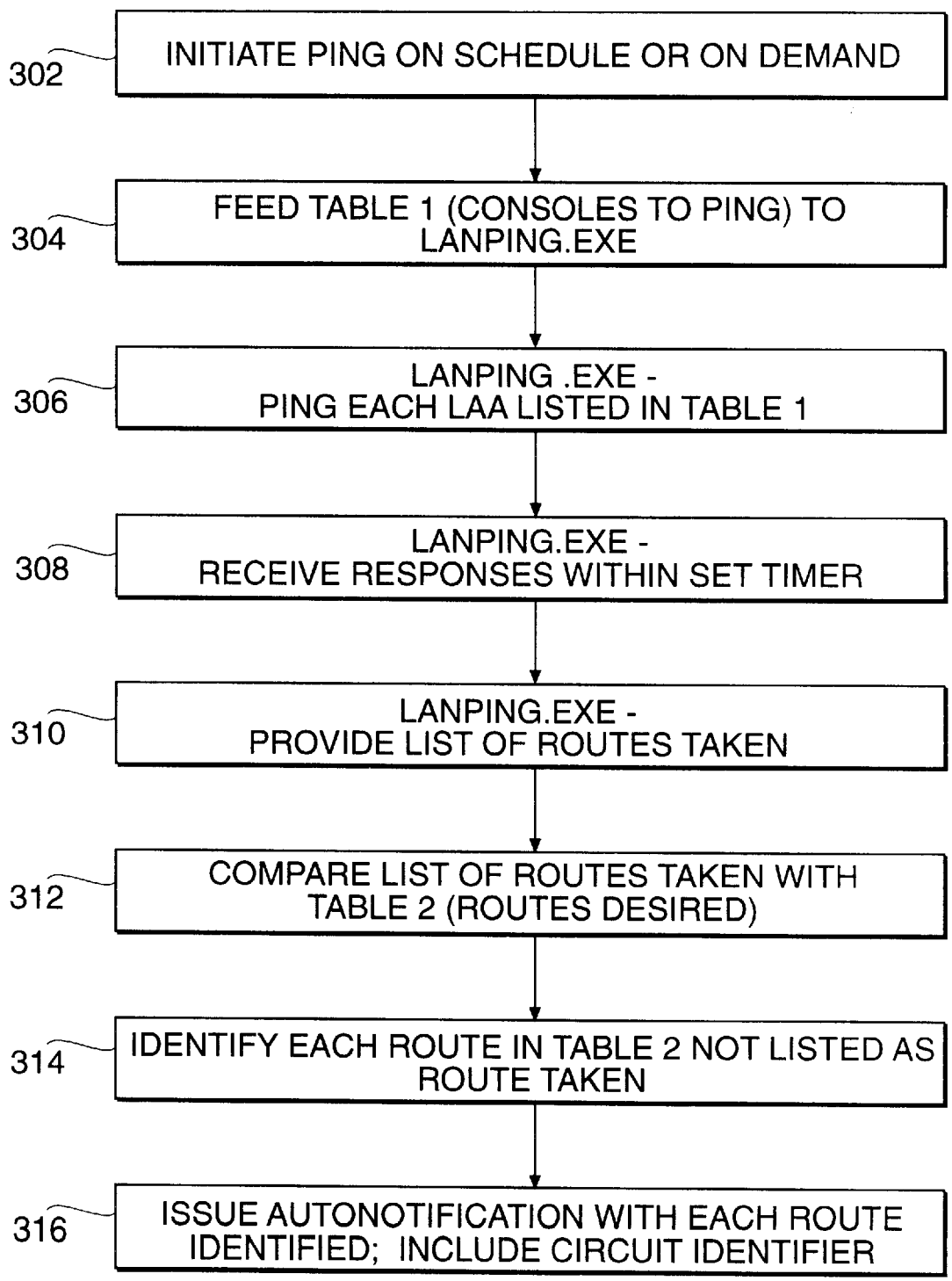
FIG. 3 is a flowchart illustrating the process performed by the remote console at a Remote Operations Center.

FIG. 3 is a flowchart illustrating the process performed by the remote console at a Remote Operations Center. The remote console is simply a standard PC that is connected to a LAN at the Remote Operations Center and subsequently to each Data Center via the WAN. This particular process illustrates the use of the invention to periodically ping a local console at each Data Center. It may also be used to ping only select Data Centers.

In step 302, the remote console initiates the process either in accordance with a defined schedule (i.e., each hour), or on demand by the user.

Pinging computers on a LAN is well-known in the industry. A ping command can have different switches (extended command parameters), one of which specifies that the route taken by the response be identified in the response. There are many LAN products that offer this capability. In the preferred embodiment of the present invention, an IBM program known as LANPING.EXE is used. LANPING.EXE reads a file of network addresses and pings each address. It then provides a list of routes taken by each response received. As with the rest of the invention, LANPING executes on the remote console. Of course, this is in the preferred embodiment in a DCO network. In other embodiments, any PC on a LAN may perform this function.

In step 304, the remote console feeds Table 1 to LANPING. Table 1 is a list of Locally Administered Addresses (LAA) for Data Center local consoles that are to be pinged. Although there may be several consoles at each Data Center to ping, in the preferred embodiment, only one console at each Data Center will be pinged. This is sufficient to determine availability of routes between that Data Center and the Remote Operations Center.

An example of Table 1 is illustrated in FIG. 4. It simply lists the various LPARs (SAC 1, NOR1, etc.) and the LAAs of the consoles to ping. An LPAR is a logical partition of a main frame computer capable of operating independently of other partitions. Conventionally, an LPAR of a main frame computer at a Data Center is connected to a local console which may be a PC. SAC1, NOR1, etc. in column 1 of Table 1 are LPARs and are informational only, while the second column represents addresses of local consoles being monitored for the corresponding LPAR. The LAA is an industry-standardized format of a LAN/WAN network address. LANPING reads these LAAs in this format and pings each address.

In step 306, LANPING pings each LAA listed in Table 1. In step 308, it receives responses for each ping. There will be multiple responses received for each ping, indicating the multiple routes that may be taken between each Data Center and Remote Operations Center. It continues receiving responses until the set timer expires. As noted previously, this timer is set to ensure all responses taking relevant routes are received, but that responses taking extended, rogue routes are not collected in excess. Generally, a few seconds is sufficient.

In step 310, LANPING provides a list of responses received. These responses will indicate the routes taken, in accordance with the standard ping command. FIG. 6 is a sample display of an actual LANPING output. This sample uses different node and circuit identifiers than the simplified version of FIG. 1.

In step 312, these routes are compared with Table 2. Table 2 is a list of routes desired; that is to say, it is a list of routes that DCO staff are interested in monitoring. Each route provided by LANPING as a ping response is matched to a route in Table 2. An example of Table 2 is illustrated in FIG. 5. It identifies the route (in node-by-node format previously described) and also a proprietary circuit identifier that is associated with that route. The circuit i.d. is used to identify the possible circuit outage in the autonotification that will be sent. In fact, Table 2 contains the actual text message to be sent in such an autonotification. For example, if it is determined that the route identified in record #2 is unavailable, then an autonotification (such as an autopage, described later in reference to step 316) is issued with the text from Table 2 record #2 "THE MGH49114-0008 CIRCUIT FROM ROC1 TO DC1 IS DOWN". This indicates that the circuit from Remote Operations Center 1 to Data Center 1, with circuit identifier MGH4911-4008, is possibly down and requires attention.

The records in Table 2 are numbered only for reference in this discussion. FIG. 5 is only a sample of records from Table 2; in reality, there will be many more records, such as those for routes initiated from Remote Operations Center 2.

Not all possible routes need be listed in Table 2. Only those routes of interest to DCO are listed. Even though other routes may be taken in response to a ping, these do not need to match a route in Table 2 since they are not of interest to DCO. The comparison in step 312 is to ensure each route listed in Table 2 matches a route taken.

In step 314, any routes in Table 2 that are not matched to a route taken are identified. In step 316, an autonotification is issued for these routes. The circuit identifier from Table 2 in FIG. 5 is included in this notification.

For example, referring to FIG. 1, suppose a remote console at Remote Operations Center 1 tests the availability of all Data Centers. It pings a local console at each of the four Data Centers. Further suppose the list of response routes provided in step 310 is as follows:

A11 - B11
A11 - C11 - A22 - B22
A11 - C22 - A22 - B22
A11 - B22
A11 - C11 - A22 - B33
A11 - C22 - A22 - B33
A11 - B33
A11 - C11 - A22 - B44
A11 - C22 - A22 - B44
A11 - B44

The invention compares this list with Table 2 shown in FIG. 5. In step 314, it identifies the routes in records #1 and #2 of Table 2 as not taken (non-responsive route). In step 316, it issues an autonotification identifying circuits MGH49114-0003 and MGH49114-0008 as unavailable. Specifically, it sends alpha-numeric pages with the messages "THE MGH49114-0003 CIRCUIT FROM ROC1 TO DC1 IS DOWN", and "THE MGH49114-0008 CIRCUIT FROM ROC1 TO DC1 IS DOWN". Alternatively, it may send a single page for each message.

The following explains further identification of down circuits from a consideration of records #1 and #2 (FIG. 5) for which responses are not received. The automated analysis assumes that since A11-B11 route was taken, there are no problems with this connection, as evidenced by the A11-B11 term in record 3. It further assumes that since links C11 and C22 are included in other routes that were taken, there are no problems with these (the A22-B11 term in records #1 and #2). It concludes that there must be an outage associated with the connection between Data Center 1 (B11) and Remote Operations Center 2 (A22). It can also identify this in the autonotification.

The autonotification process, per se, is not claimed with the present invention, and any notification process will suffice. An exemplary autonotification that can be used is described and claimed patent application Ser. No. 08/663, 401.

The invention provides a simple and automated means for monitoring an internal LAN/WAN network. Many systems exist that perform this function with great complexity, expense, and setup effort. This invention performs in a very simple manner and with little setup effort and expense. Furthermore, it is fully automated and provides detection, analysis, and notification of unavailable routes with no human intervention. No other system has been identified that analyzes ping responses to determine unavailability of LAN/WAN connections.

The distinguishing features are the automated analysis of ping responses and the identification of unavailable routes. The issuance of autonotifications may be desirable; however, an actual autonotification system is not part of the present invention, per se.

The invention allows a DCO staff to perform first-level monitoring of their own network. This removes total dependency on Network Management to notify DCO of network outages, and provides a quicker notification of outages. It does this without the need for any additional personnel.

It should be understood that the invention is not limited to the exact details of construction shown and described herein for obvious modifications will occur to persons skilled in the art.

We claim:

1. In a system including at least one Remote Operations Center (ROC) having a remote console connected to the ROC by a LAN and subsequently connected to a plurality of Data Centers through a WAN, a plurality of local consoles respectively connected to the Data Centers by additional LANs, a method performed by the remote console for monitoring possible outages occurring in the resulting LAN/WAN network and comprising the steps:

initiating a ping process at the remote console;
   reading a file of prestored LAN/WAN network addresses at the remote console;
   pinging each of the prestored addresses of the LAN/WAN network, execution of the pinging process occurring at the remote console;
   receiving multiple responses from each ping of the addresses indicating the multiple routes that may be taken between each Data Center and the ROC;
   continuing the receiving of responses for a preselected time period to ensure all responses taking relevant routes are received, but that responses taking extended, rogue routes are not collected;
   generating a list of routes taken by each response received;
   comparing a list of routes taken by each response received to a preselected list of routes desired for determining respective matches;
   identifying routes desired that lack a match of routes taken, indicative of a possible outage in the unmatched route; and
   generating a notification of the unmatched routes.

2. The method set forth in claim 1 wherein the step of initiating the ping process at the remote console occurs in accordance with a defined schedule and/or on demand by a user.

3. The method set forth in claim 1 wherein the step of pinging each of the addresses at the remote console includes executing a ping command at the remote console, the command having a plurality of switches (extended command parameters), one of which specifies that the route taken by the response be identified in the response.

4. The method set forth in claim 1 wherein the plurality of local consoles are interconnected by a LAN at the Data Center, and further wherein only one console at each Data Center will be pinged, this being sufficient to determine availability of routes between that Data Center and the Remote Operations Center.

5. The method set forth in claim 1 wherein each desired route is formatted to identify the nodes therealong and a circuit identifier respectively identified with the route.

6. The method set forth in claim 5 together with the step of providing autonotification for routes where matches are lacking, the circuit identifier being included in the autonotification.

7. In a system for automatically monitoring a Data Center Operations (DCO) network including at least one Remote Operations Center (ROC) having a remote console connected to the ROC by a LAN and subsequently connected to a plurality of Data Centers through a WAN, local consoles respectively connected to the Data Centers by additional LANs, a method performed by the remote console for monitoring possible outages occurring in the resulting LAN/WAN network and comprising the steps:

initiating a ping process at the remote console in accordance with a defined schedule and/or on demand by a user;

reading a file of prestored LAN/WAN network addresses at the remote console;

pinging each of the prestored addresses of the LAN/WAN network, execution of the pinging process occurring at the remote console, including executing a ping command that has a plurality of switches (extended command parameters), one of which specifies that the route taken by the response be identified in the response;

wherein only one console at each Data Center will be pinged, this being sufficient to determine availability of routes between that Data Center and the Remote Operations Center;

receiving multiple responses from each ping of the addresses indicating the multiple routes that may be taken between each Data Center and the ROC;

continuing the receiving of responses for a preselected time period to ensure all responses taking relevant routes are received, but that responses taking extended, rogue routes are not collected;

generating a list of routes taken by each response received;

comparing a list of routes taken by each response received to a preselected list of routes desired for determining respective matches;

the list of desired routes being formatted to identify the nodes therealong and a circuit identifier respectively identified with the route;

identifying routes desired that lack a match of routes taken, indicative of a possible outage in the unmatched route; and generating a notification of the unmatched routes.

8. The method set forth in claim 7 further comprising the step of providing autonotification for routes where matches are lacking, the circuit identifier being included in the autonotification.

9. The method set forth in claim 8 wherein the circuit identifier is used to identify the possible circuit outage in the autonotification.

10. The method set forth in claim 9 wherein the list of desired routes contains the actual text message to be sent in an autonotification of lacking matches, the text concerning possible outages of the circuits corresponding to the circuit identifiers.

* * * * *